ELECTRIC FILTER

Filed April 29, 1958 3 Sheets-Sheet 1

INVENTOR.
ALBERT R. KALL
BY Leon Edelson
ATTORNEY

INVENTOR.
ALBERT R. KALL
BY [signature]
ATTORNEY

May 2, 1961 A. R. KALL 2,982,928

ELECTRIC FILTER

Filed April 29, 1958 3 Sheets-Sheet 3

INVENTOR.
ALBERT R. KALL

BY Leon Edelson

ATTORNEY

United States Patent Office

2,982,928

Patented May 2, 1961

2,982,928

ELECTRIC FILTER

Albert R. Kall, 2129A S. John Russell Circle, Elkins Park, Pa.

Filed Apr. 29, 1958, Ser. No. 731,688

11 Claims. (Cl. 333—70)

This invention relates to electric wave filters, and more particularly to small physical size harmonic suppression low-pass filters which provide minimal insertion loss at a desired fundamental frequency combined with the property of maximum attenuation to prominent harmonics thereof. Filters of the type to be described are susceptible of design for a wide variety of applications and are capable of performance not achievable by any other known devices which also meet the requirement of severely restricted physical size.

The radio interference performance requirements of certain types of airborne communications equipment is illustrative of a problem which has been solved by my invention and for which heretofore no solution existed. Typically, performance requirements for airborne radio transmitter equipment may include the restriction that the level of all harmonic and other spurious frequencies within the frequency range from 150 kilocycles to 1,000 megacycles, in the radio frequency output line to the transmitter antenna, be at least 80 decibels below the level of the carrier frequency. Within this frequency range lies a telemeter band which extends from 235 megacycles to 255 megacycles and in connection with which an embodiment of my invention will be subsequently described in detail.

Carrier frequencies in this band are generelly developed by multiplication of the frequency of a base oscillator. The base oscillator frequency and its significant harmonics represent, of course, undesired sub-harmonic frequencies of the developed carrier and must be suppressed to the desired −80 decibel level in the output line from the carrier transmitter to the antenna. These sub-harmonic frequencies are generally suppressible without great difficulty by efficient design of the below-carrier frequency circuits, but the suppression of carrier frequency harmonics generated in the output circuit are extremely difficult to control. An efficient and well-designed output circuit may have carrier frequency harmonic levels of the order of 30 to 50 decibels below carrier, and the only way to further suppress these harmonics is by means of an efficient bandpass or low-pass filter in the output circuit.

In the past, known types of filters have been based on conventional design in that they consisted of constant-K or M-derived filter sections, or combinations of such. When the allowable space to be occupied by the filter is restricted by other considerations to 1 or 1½ cubic inches, the filters based on such conventional design methods prove to be inadequate. As a rule, such filters may provide sufficient attenuation at the third and higher carrier harmonic frequencies but fail by a considerable margin at the second harmonic frequency, which is the most prominent.

The reason for such failure resides in the fact that at best only two constant-K designed filter sections can be incorporated into volumes of the order previously mentioned. With such a design, if the maximum allowable insertion loss at carrier frequency is 0.3 decibel, then the best attainable attenuation versus frequency characteristic can provide a maximum of 30 decibels of attenuation at the second harmonic frequency which is insufficient to reduce the harmonic to the required 80 decibels below carrier level, even if the unfiltered second harmonic is already 50 decibels down. This results from the fact that the system in which such filters are customarily aligned and tested can not sufficiently closely simulate the terminal impedance conditions which exist with the filter installed in the transmitter for which it was designed and with which it is to be used. As an example of the foregoing difficulty, instances have occurred where a filter was required which provided 60 decibels of attenuation at the carrier second harmonic frequency in order to reduce to the −80 decibel level a second harmonic frequency component that was already at the −40 decibel level. It is clear that the filter was only effective in producing 40 decibels of attenuation instead of the measured value of 60 decibels because of the impedance conditions encountered when the filter was connected to the transmitter.

While conventionally designed filters can be made to provide harmonic attenuation equivalent to filters constructed according to my invention, such conventional filters also require a physical volume which ranges from 3 to 7 times greater than that required by a filter according to my invention and are therefore wholly unacceptable for many applications. Additionally, such conventinally designed filters are more costly to produce.

Briefly, my invention involves the use of non-coupled highly selective inductance-capacitance trap circuits which provide a filter whose individual trap attenuation properties are substantially linearly additive at any frequency within the design range. Additionally, each trap circuit further provides a residual attenuation characteristic for frequencies higher than the trap frequency, the residual attenuation of multiple traps being likewise linearly additive. This additive residual attenuation characteristic is highly effective in reducing undesired sum and difference frequency combinations of carrier harmonics and sub-carrier signals. The filter may be designed for single frequency carrier operation or for use with transmitters covering a band of carrier frequencies. In the former case only a single trap is required at each harmonic to be suppressed, whereas, in the latter case certain of the harmonic bands, not necessarily all, may require multiple frequency-staggered traps. Accordingly, it is a prime object of my invention to provide an electric wave filter which is characterized by an attenuation versus frequency characteristic between a fundamental frequency and its second harmonic which is steeper than that obtainable with conventionally designed filters occupying the same physical volume.

Another object of my invention is to provide an electric wave filter which combines a conventional low-pass characteristic below a selected frequency with a peaked attenuation characteristic at prescribed frequencies above the selected frequency together with residual attenuation plateaus between the prescribed frequencies.

Still another object of my invention is to provide an electric wave filter built-up of trap circuits for selectively rejecting preselected frequencies in which the attenuation contributed by individual traps are substantially linearly additive at any given frequency.

Yet another object of my invention is to provide a minimal sized electric wave filter capable of providing a minimum of 60 to 80 decibels of attenuation at selected frequencies above a carrier frequency with the filter coupled to the output of a carrier frequency transmitter.

The foregoing and other subjects will become clear from a careful reading of the detailed description which follows taken together with the accompanying drawings wherein.

Figures 1, 2, 3, 4, 5:
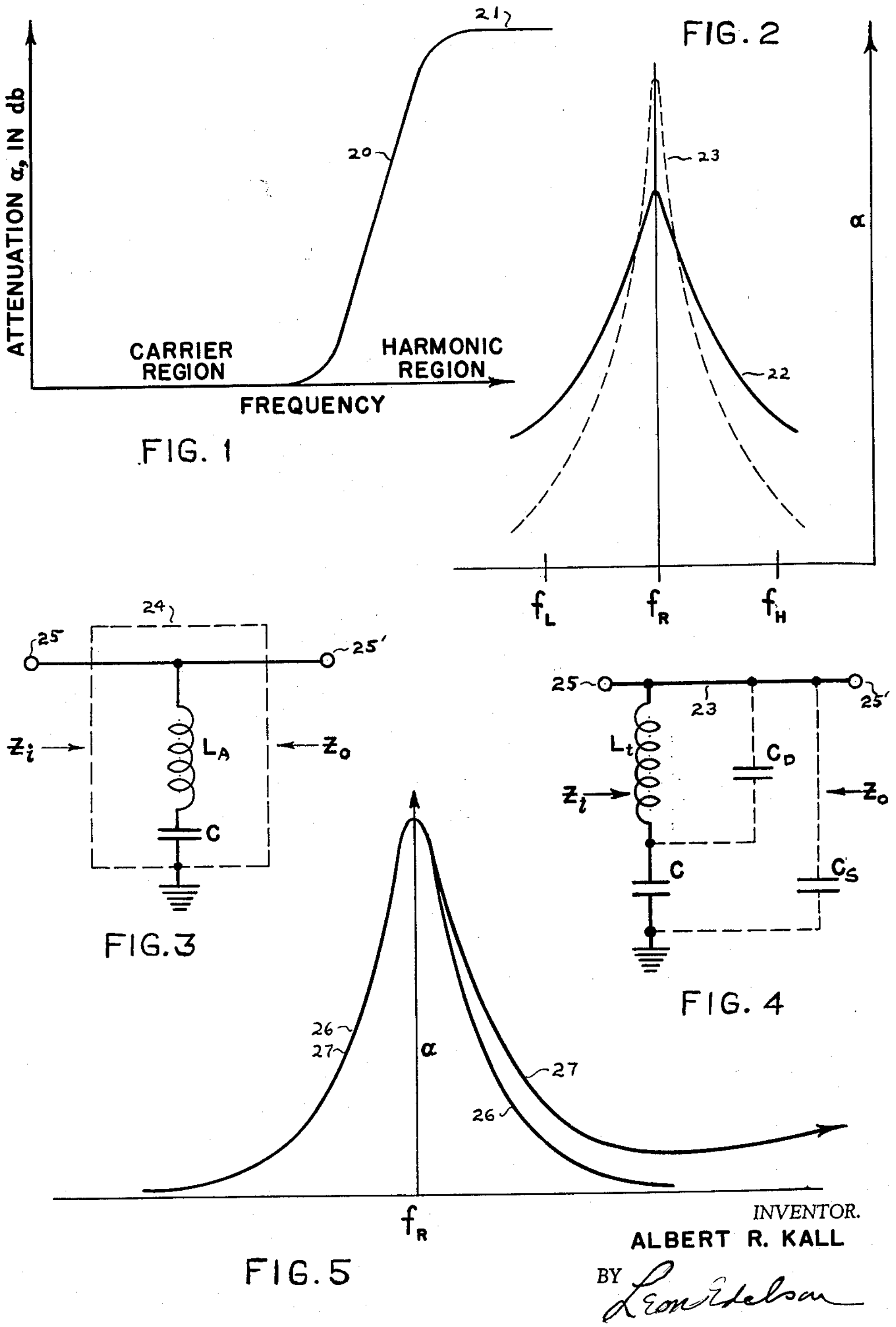
Figure 1 is a diagram of attenuation versus frequency for an ideal low-pass filter.
Figure 2 is a diagram of attenuation versus frequency for a trap-type filter in the region of trap resonance.
Figure 3 is a schematic diagram of a typical trap circuit illustrating the real circuit components used.
Figure 4 is a schematic diagram of the trap circuit of Figure 3 also illustrating the presence of stray and distributed capacitances.
Figure 5 is a diagram of attenuation versus frequency for the circuits of Figures 3 and 4 and illustrates the effect of the stray and distributed capacitances.

The attenuation versus frequency characteristics of Figures 2, 5, 7, 8 and 9 also represent the admittance versus frequency characteristics of the associated filters.

In the several figures, like elements are denoted by like reference characters.

Turn now to a consideration of the several figures for a more complete understanding of my invention, and in particular refer first to Figures 1 and 2. An ideal low-pass filter response is illustrated in Figure 1 having an attenuation plateau 21 of a specified number of decibels in the stop-band, zero attenuation in the pass-band, and a steeply rising attenuation characteristic 20 in the transition region. As earlier pointed out, the transition region attenuation characteristic 20 cannot be made sufficiently steep by conventional filter techniques to satisfy the stringent requirements of certain applications, at best being able to achieve slopes on the order of 30 decibels per octave. Hence, if the plateau level must be reached within one octave, then the plateau attenuation can be at only 30 decibels. On the other hand, trap circuits can readily be designed which are capable of producing 60 to 80 decibels of attenuation at a single frequency. Figure 2 illustrates two typical trap circuit attenuation characteristics, the dashed curve 23 showing a highly selective response and solid curve 22 indicating a characteristic resulting from lower circuit Q. Such response curves are obtainable from a circuit such as that of Figure 3, to which reference should now be had.

The circuit of Figure 3 illustrates the series combination of an apparent inductance $L_A$ and a capacitance C connected between the signal line 23 and ground. The signal line 23 is connected at the input end to a terminal 25 and at the output end to a terminal 25'. The circuit may be placed in a case 24 to provide electrostatic and electrogmagnetic shielding, the case being grounded and connected to the signal return lines of the input and output circuits. Such a circuit will have characteristic input and output impedances $Z_I$ and $Z_0$ respectively, and in the illustrated case these impedances will be the same. At a particular frequency $f_r$ the reactance of the apparent inductance $L_A$ and the reactance of the capacitance C will be equal in magnitude, but of opposite sign, so that the net reactance between the signal line 23 and ground is zero. For a theoretically perfect inductance $L_A$ and capacitance C, that is infinite Q components, the net impedance to ground on the signal line 23 at the frequency $f_r$ would be zero, and the attenuation to a signal of that frequency would be infinite. Practically of course, no inductor or capacitor is completely resistanceless and the signal attenuation at the frequency $f_r$ is therefore finite and of the magnitude determined by the maximum obtainable Q of the individual circuit components.

The resonant frequency of the series circuit of Figure 3 is governed by the relationship $$f_r=\frac{1}{2\pi\sqrt{L_A C}}$$

and of course there exists an infinite number of $L_AC$ products which satisfy this relationship. In designing a circuit such as that illustrated in Figure 3, and which will hereinafter be designated as a trap circuit, two fundamental considerations are involved. Firstly, the Q of the trap circuit must be determined to provide the optimum balance between the opposing requirements of peak attenuation and bandwidth. The Q of such a circuit may be determined from the well-known formula $$Q=\frac{1}{R}\sqrt{\frac{L_A}{C}}$$

and, as is also well known, the Q is therefore determined by the ratio of the inductance to the capacitance. For example, curve 23 of Figure 2 is characteristic of a circuit having a higher $L_A/C$ ratio than the circuit characterized by the curve 22. These curves bring out the fact that higher Q is associated with narrower bandwidth. The second factor which must be considered is the distributed capacitance of the coil turns of the inductance and the stray capacitance in parallel with the trap circuit from the signal line to ground. Figure 4 illustrates the circuit of Figure 3 with the distributed and stray capacitances illustrated.

In Figure 4, $C_D$ represents the distributed capacitance between turns of the true inductance $L_t$ and effectively shunting it, while the capacitance $C_S$ represents the strap capacitance to ground from the signal line 23, and therefore in shunt with the entire trap circuit. The apparent inductance $L_A$ of Figure 3 of course represents the magnitude of the true inductance $L_t$ of Figure 4 as modified by the presence of $C_S$ and $C_D$. In practice it has been found that the capacitance C is generally an order of magnitude or better larger than either $C_D$ or $C_S$ and therefore the latter two capacitances may be considered to be effectively in parallel across the inductance $L_t$. In the past the presence of these stray and distributed capacitances has been considered an evil, and extensive precautions are always taken to confine their magnitude to the irreducible minimum. However, by carefully controlling the magnitude of the stray and distributed capacitances so that the inductive reactance of the coil L is by-passed to the correct degree by the capacitive reactance at a frequency not too far above the resonant frequency $f_r$, a development of great significance to the effectiveness of filter design has been achieved. The predictable effect of careful control of $C_D$ and $C_S$ is illustrated in the response curve of Figure 5.

Curve 26 of Figure 5 is similar to curves 22 and 23 of Figure 2 in that it is characterized by a symmertical hairpin shape whose skirts approach the zero axis asymptotically on both sides of $f_r$. Such a resonance curve corresponds to the response of a trap circuit in which $C_D$ and $C_S$ are either non-existant (so-called ideal case) or have been reduced to negligible magnitude in the region of the resonance frequency $f_r$. On the other hand, curve 27 of Figure 5 illustrates a resonance characteristic in which a predictable amount of $C_D$ and $C_S$ has been deliberately introduced to modify the response curve skirt characteristic above the resonant frequency $f_r$ of the trap circuit.

It should be observed that the below resonance skirt approaches the zero attenuation axis as for a pure LC circuit, because the impedance of a series circuit is capacitive at frequencies below $f_r$, approaching infinity at zero frequency. The attenuation therefore approaches zero at zero frequency. The above resonance skirt of curve 27 however levels off at a certain attenuation greater than zero and, when carried out some distance beyond $f_r$ again beings to rise. This effect is due to the fact that at frequencies above $f_r$ the reactance of capacitor C becomes progressively les than the reactance of inductor $L_t$ but the reactance $L_t$ is increasingly shunted by the decreasing reactance of $C_D$ and $C_S$ so that at much higher frequencies $$\left(f>\frac{1}{2\pi\sqrt{Lt(C_D+C_S)}}\right)$$

the impedance from the signal line 23 to ground becomes purely capacitive with a consequent rise in the attenuation curve. The approach to zero attenuation at frequencies below $f_r$ provides a low-pass filter characteristic wherein a fundamental carrier frequency may be passed with substantially zero or very low incidental attenuation. On the other hand, the residual plateau of attenuation above $f_r$ produced by the careful introduction of $C_D$ and $C_S$ provides a filter characteristic wherein additively increasing attenuations may be provided between the resonant peaks of multinetwork filters to be now described.

Figures 6, 7:
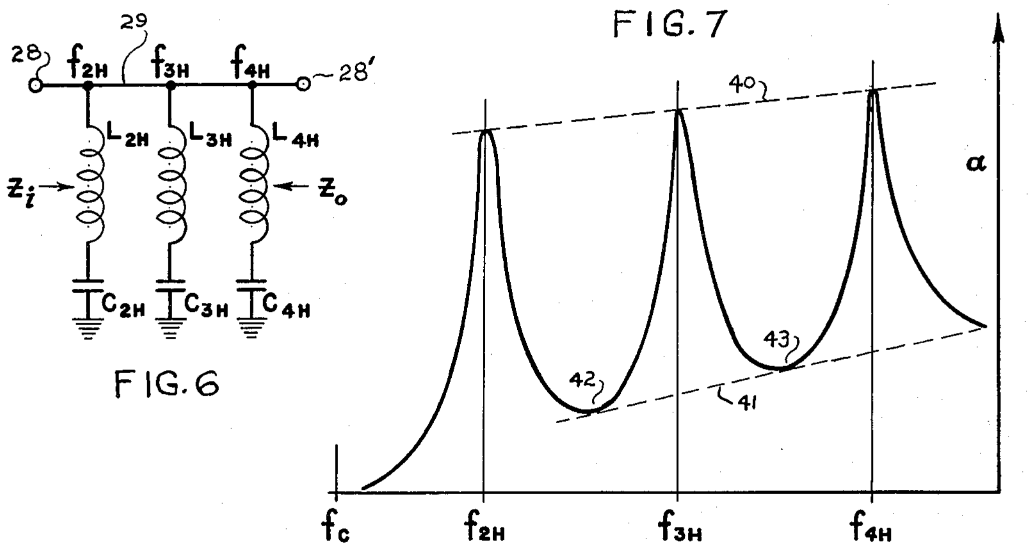
Figure 6 is a schematic diagram of a typical multiple trap circuit.
Figure 7 is a diagram of attenuation versus frequency for the circuit of Figure 6.

Figure 6 illustrates a simple multi-trap filter circuit, and its response curve is shown in Figure 7. It should be borne in mind that distributed and stray capacitances similar to $C_D$ and $C_S$ in the showing of Figure 4 are associated with each of the trap circuits of Figure 6 although they are not illustrated therein. Figure 6 illustrates a filter composed of three individual trap circuits each of which is tuned to a particular harmonic $f_{2H}$, $f_{3H}$, or $f_{4H}$ of a carrier frequency $f_C$. The $f_{2H}$ trap, composed of the inductor $L_{2H}$ and the capacitor $C_{2H}$ is designed for series resonance at the second harmonic of the carrier frequency $f_C$. Likewise, the traps $f_{3H}$ and $f_{4H}$ composed respectively of $L_{3H}C_{3H}$ and $L_{4H}C_{4H}$, are tuned to the third and fourth harmonic frequencies of the carrier $f_C$. All of these trap circuits are connected between the signal line 29 and ground so that a signal presented at the input terminal 28 appears at the output terminal 28' attenuated according to the filter response characteristic illustrated in Figure 7. Figure 7 illustrates attenuation peaks at the second, third, and fourth harmonics of the carrier frequency $f_C$ with valleys between the peaks.

It is seen that the valley or plateau 42 between the second and third harmonics $f_{2H}$ and $f_{3H}$ is substantially above the zero attenuation level, and that the plateau 43 between the third and fourth harmonics $f_{3H}$ and $f_{4H}$ is still higher on the attenuation scale. The plateaus 42 and 43 are illustrated as tangent to a dashed line 41 which is extended beyond the fourth harmonic frequency $f_{4H}$ and is tangent to the plateau thereabove. The dashed line 41 is thus seen to define a plateau envelope of attenuation which increases steadily with increasing frequency. This envelope, of course, may not always be represented as a straight line, but will vary according to the particular coordinate system used to depict the attenuation response and the design degree of plateau attenuation associated with each trap circuit. The envelope defining line 41 is intended merely to illustrate the cumulative attenuation effect of the plateaus associated with each of the trap circuits. For example, the plateau 43 includes the additive attenuation effects of the plateau 42 associated with the second harmonic trap and the attenuation plateau associated with the third harmonic trap. The cumulative effect of the plateau attenuations 42 and 43 on the peak attenuations of the third and fourth harmonics is illustrated by the dashed line 40 which defines a peak attenuation envelope.

Figure 8:
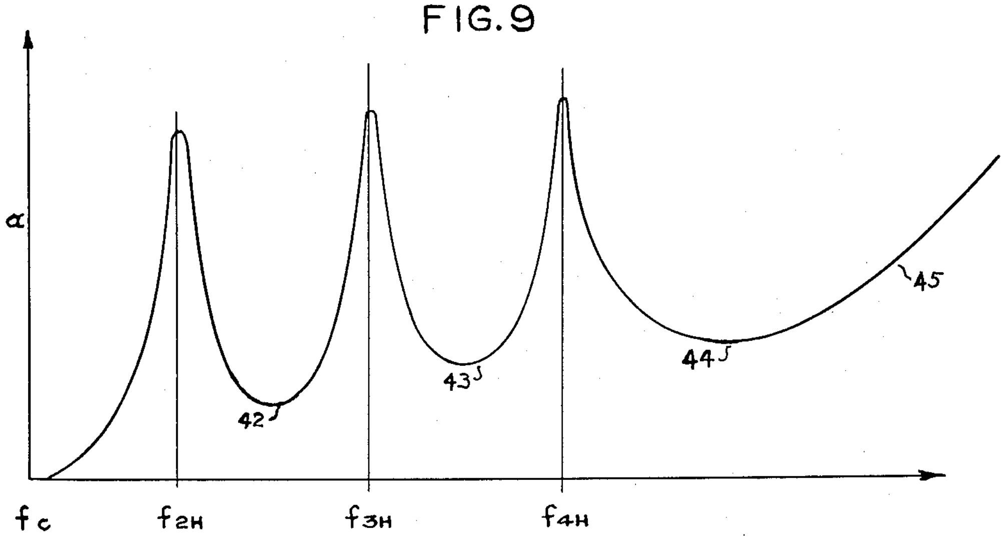
Figure 8 is similar to Figure 7 but also shows the cumultave effect of the residual attenuation characteristics of the trap circuits with increasing frequency.

As for the line 41, the line 40 may not necessarily be straight as shown, but will depend upon the Q associated with each of the harmonic traps. For example, the line 40 is shown to be of somewhat smaller slope than the line 41 which indicates that the Q's of successive harmonic traps have been succesively lowered. The attenuation characteristic illustrated in Figure 8 is similar to that of Figure 7 but illustrates the cumulative effect of the plateau attenuations 42, 43, and 44 at frequencies extending to substantially beyond the fourth harmonic. The absence of peaks in the attenuation region 45 above the plateau 44 is, of course, due to the fact that no trap circuits are resonant in this region.

The triple trap circuit of Figure 6 having an attenuation characteristic as illustrated in Figures 7 and 8 is obviously far superior to the conventionally designed type of filter, not only because of the markedly reduced physical size required to house such a filter but more importantly because it provides extreme attenuations at the critical harmonic frequencies together with negligible attenuation at the desired carrier frequency and sufficiently effective attenuation in the regions between harmonics. Such a filter is completely satisfactory for the suppression of spurious signals generated by a fixed carrier frequency transmitter.

Figure 10:
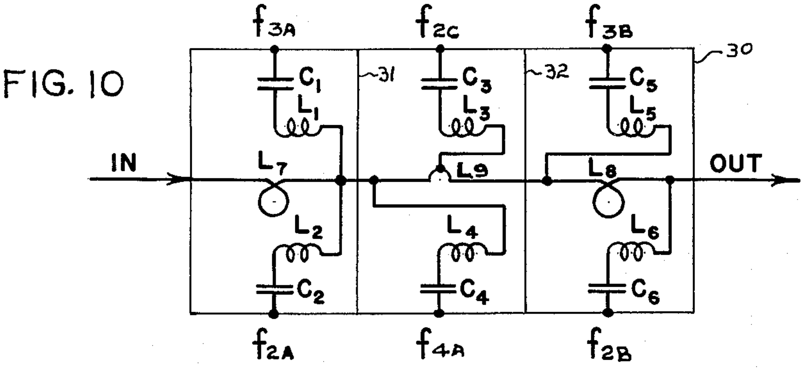
Figure 10 is a schematic wiring diagram of a filter for producing the attenuation characteristic of Figure 9.
Figure 11:
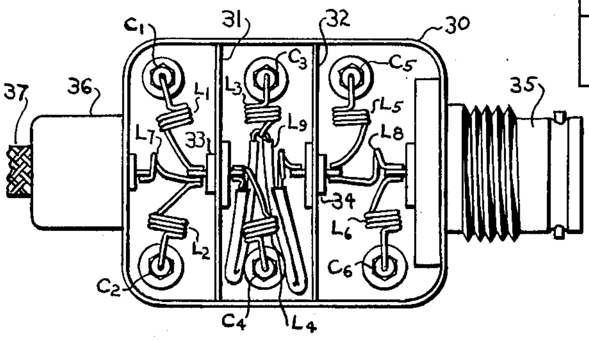
Figure 11 is a pictorial diagram of the filter of Figure 10 illustrating a typical physical configuration of the filter case and component location.
Figure 9:
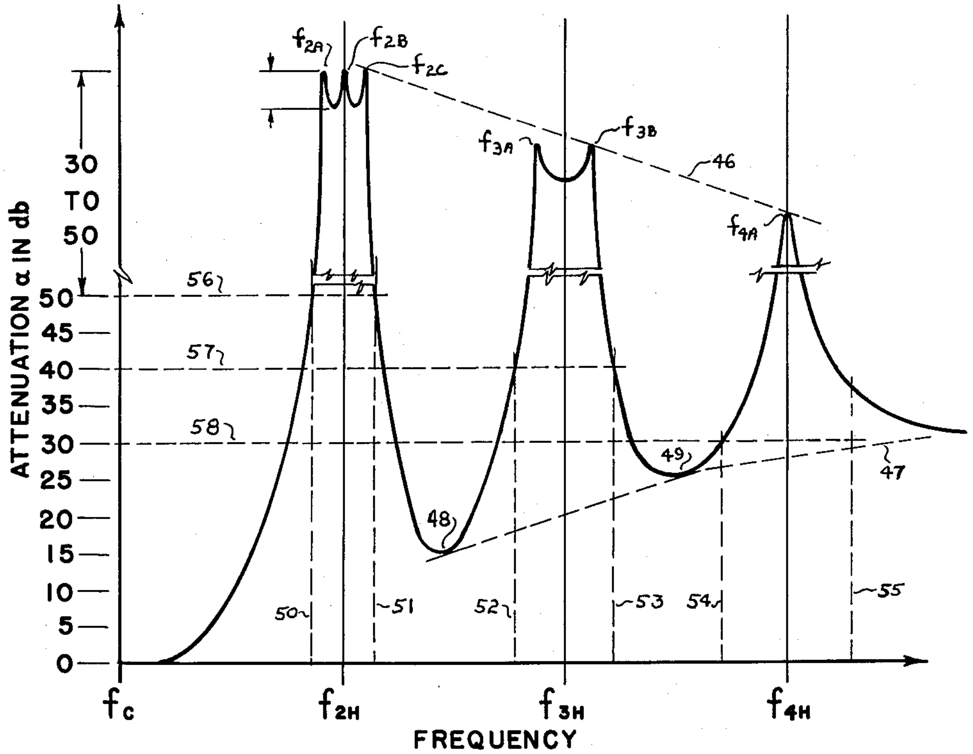
Figure 9 is a diagram of attenuation versus frequency for a harmonic band multiple trap circuit.

However, where the carrier frequency $f_C$ may lie anywhere within a range of frequencies, for example the 235 to 255 megacycles telemeter range, the filter, since it must be capable of use interchangeably with transmitters having carriers anywhere within this range, must provide the required attenuation over the entire harmonic ranges. For example, if the carrier frequency may lie anywhere within the range of 235 to 255 megacycles, then the range of second harmonic frequencies will lie between 470 and 510 megacycles, and the third harmonic frequencies will lie between 705 and 765 megacycles, and the fourth harmonic frequencies will lie between 940 and 1,020 megacycles. Filters for providing such performance are readily realizable by employing trap circuits as previously described. The generalized response characteristics of one possible filter for such an application is illustrated in Figure 9. Figures 10 and 11 illustrate respectively a schematic wiring diagram and a pictorial diagram of a six trap filter capable of producing the attenuation characteristic illustrated in Figure 9.

The attenuation characteristic of Figure 9 illustrates on the frequency scale the location of the carrier frequency $f_c$, the second harmonic $f_{2H}$, the third harmonic $f_{3H}$, and the fourth harmonic $f_{4H}$. Additionally, the dashed lines 50 and 51 define a range of frequencies representative of the second harmonics of a band of carrier frequencies. Similarly, the dashed lines 52 through 55 define the third and fourth harmonic ranges for the same carrier frequency band. The horizontal dashed lines 56, 57, and 58 correspond respectively to the minimum attenuation that must be provided by the filter over the second, third, and fourth harmonic frequency ranges. That is, the minimum filter attenuation over the second harmonic range must be 50 decibels, the third harmonic frequency range requiring 40 decibels, and the fourth harmonic frequency range requiring 30 decibels of minimum attenuation. These minimum attenuation requirements are, of course, established by the characteristics of the transmitters with which the filter is to be used. It will be observed that the second harmonic attenuation characteristic is characterized by the presence of three peaks, these peaks being designated respectively as $f_{2A}$, $f_{2B}$, and $f_{2C}$. Similarly, the third harmonic frequency range is characterized by the presence of two peaks $f_{3A}$ and $f_{3B}$, while the fourth harmonic range is characterized by only a single peak $f_{4A}$. Each of these peaks is due to an individual trap circuit, so that it is apparent that six individual traps are required to produce the attenuation characteristic of Figure 9. The presence of these six traps is shown in Figures 10 and 11.

The trap frequencies for a filter having this response characteristic and designed to operate with transmitters having carrier frequencies in the range of 235 to 255 megacycles would typically be as follows:

| | Megacycles |
|---|---|
| $f_{2A}$ | 475 |
| $f_{2B}$ | 490 |
| $f_{2C}$ | 505 |
| $f_{3A}$ | 710 |
| $f_{3B}$ | 760 |
| $f_{4A}$ | 980 |

It should be noted that although the harmonic frequency ranges around $f_{3H}$ and $f_{4H}$ are broader than the frequency range about $f_{2H}$, yet fewer trap circuits are required within the third and fourth harmonic ranges. This is due to two factors. First, since a lower attenuation is required at each of these frequency bands, the required Q of the individual traps may be lowered. Second, the plateau attenuations provided by the second and third harmonic trap circuits reduce the attenuation requirement to be fulfilled by the third and fourth harmonic traps.

In the particular example illustrated, each of the trap circuits provides a plateau attenuation level of approximately 5 decibels, so that the plateau 48 between the second and third harmonic frequency ranges is approximately 15 decibels. The two trap circuits associated with the third harmonic band provide an additional 10 decibels so that the plateau 49 between the third and fourth harmonic ranges is approximately 25 decibels of attenuation. The fourth harmonic trap provides an additional 5 decibels of attenuation, thus establishing the plateau above the fourth harmonic range at a minimum of 30 decibels. Beyond this frequency range the attenuation again begins to increase as each of the trap circuits becomes completely capacitive in nature.

The need for three trap circuits to cover the second harmonic frequency range is dictated by the fact that a very steep attenuation slope is required between the carrier frequency and the lower edge of the second harmonic band in order that the minimum permissible attenuation be achieved consistent with the requirement of steep slope. This imposes a high Q condition on the trap circuits associated with the second harmonic range, and hence the narrower attenuation bandwidth provided by each of the traps must be accommodated for by employing more trap circuits. The envelope of the second harmonic attenuation curve is therefore the algebraic sum of the contributions of the three individual trap circuits. The relatively close frequency spacing of the high Q trap circuits improves the attenuation wave form because the low resistive impedance at resonance, at say $f_{2B}$, is further reduced by the shunting effect of the near resonant impedances of the circuits at $f_{2A}$ and $f_{2C}$. This shunting effect results in relatively small dips between the attenuation peaks within a given harmonic range, and may be for example on the order of 3 to 7 decibels, as illustrated in Figure 9.

When constructing a filter according to my invention, for example one similar to that for producing the response characteristic of Figure 9, care must be exercised to decouple trap circuits lying at nearby frequencies or the phenomenon known as "pulling" may be encountered. This "pulling" phenomenon may be described as the effect of one circuit coupling electrostatically and/or magnetically with another, producing in effect a single electrical circuit with a net resonant frequency and Q different from those of the individual circuits. Dashed line 46 illustrates the peak attenuation envelope and dashed line 47 illustrates the plateau attenuation envelope.

Figure 12:
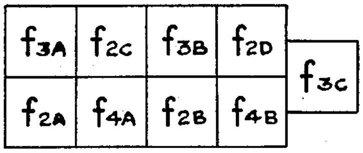
Figure 12 is a typical layout diagram for the physical placement of individual trap circuits of a nine trap filter.

Turn now to a consideration of Figures 10 and 11 which may conveniently be considered at the same time. There is shown a metal filter case 30, which is a box closed on all sides except one. Two partitions 31 and 32, also of metal, are integrally connected to the sides of the box, as for example by soldering, and divide the box into three compartments of substantially equal volume. When the filter has been completely assembled and an appropriate potting compound has been filled into the unoccuppied volume of each compartment a metal cover is soldered to the open side of the filter case. The metal filter case 30 and the partitions 31 and 32 provide electrostatic and magnetic shielding from external fields and also between the trap circuits located in different compartments. Such a construction has been found necessary to avoid the "pulling" phenomenon previously described. Each of the compartments contains two trap circuits, for example as seen in Figure 10, the left-hand compartment contains the traps tuned to frequencies $f_{2A}$ and $f_{3A}$ in the second and third harmonic ranges respectively; the central compartment contains the trap circuits tuned to the frequencies $f_{2C}$ and $f_{4A}$ in the second and fourth harmonic ranges respectively; and the right-hand compartment contains the traps tuned to $f_{2B}$ and $f_{3B}$. It should be noted that not more than one trap tuned to a frequency in a given harmonic band is placed in any given compartment. For example, the traps tuned to $f_{2A}$, $f_{2B}$, and $f_{2C}$ are seen to be in separate compartments. Similarly so placed are the traps tuned to $f_{3A}$ and $f_{3B}$, these circuits lying respectively in the left-hand and right-hand compartments. Such trap placement is utilized in order to take advantage of the shielding effect provided by the case 30 and the partitions 31 and 32. An extended generalized scheme for trap circuit placement is illustrated in Figure 12 which illustrates a 9 trap filter. Such a system of trap placement is, of course, extendable to any desired number of trap circuits.

In addition to the trap circuits L1, C1 through L6, C6 shown in Figures 10 and 11, three additional inductances L7, L8, and L9 are shown. The inclusion of the inductances L7 and L8 is not directly involved in the attenuation characteristics of the filter, but these are required in some cases to decouple the filter from the transmitter and from the output signal line in order to prevent spurious oscillation and provide a better power match. The inclusion of the inductance L9 has, however, been found to be mandatory to provide decoupling between the various trap circuits. It can be seen that this inductance L9 decouples from each other all of the second harmonic trap circuits, both of the third harmonic trap circuits, and the two trap circuits within the central compartment. The combined effect of the decoupling resulting from the use of the inductance L9 and the compartmented case 30 results in a multi-trap filter network having characteristics which are the sum of the individual characteristics of the trap circuits without being modified by the "pulling" phenomenon.

As best seen in Figure 11 the capacitors C1 through C6 are of such physical design that they may be soldered directly to the filter case 30 and thereby eliminate any significant lead inductance. The inductors L1 through L6 are conveniently formed by wrapping the capacitor leads on an appropriate coil form and subsequently withdrawing the form from the finished coil. Feed throughs 33 and 34 provide signal line continuity through the case partitions 31 and 32. The input terminal of the filter may be conveniently connected to the transmitter by cable 37 which is itself physically secured to the filter case 30 by means of a connector 36. In a 50 ohm impedance system the cable 37 could be for example RG141/U shielded cable, and the output connector 35 may be a UG–911/U type.

Typical component values for a filter of the physical configuration illustrated in Figure 11 and having a response characteristic similar to that shown in Figure 9 are as follows:

L1, C1 tuned to 710 megacycles with C1=4.3 mmf., L1=2 turns

L2, C2 tuned to 475 megacycles C2=4.3 mmf., L2=4 turns
L3, C3 tuned to 505 megacycles C3=4.3 mmf., L3=3½ turns
L4, C4 tuned to 980 megacycles C4=2.2 mmf., L4=1 turn
L5, C5 tuned to 760 megacycles C5=4.3 mmf., L5=1½ turns
L6, C6 tuned to 490 megacycles C6=4.3 mmf., L6=3½ turns The inductors L1 through L6 are formed from the 20 gage wire leads of the capacitors C1 through C6 and are wound on a 3/32" rod with the coil turns separated by approximately 1/32". The single turn inductors L7 and L8 may be wound as for the inductors L1 through L6 but the coil ends should be separated by a greater amount, on the order of 1/16 of an inch. The series tapped inductance L9 in the central compartment may be formed from a 3 inch length of 20 gage wire and of approximately 1½ turns. The measured performance of the foregoing filter in a 50 ohm system provided 60 to 65 decibels of attenuation over the second harmonic range, 65 decibels average attenuation over the third harmonic range, 50 decibels of attenuation over the fourth harmonic range and a carrier frequency insertion loss of ½ decibel maximum.

In order to design a filter according to my invention which will provide a predetermined attenuation characteristic combined with the utilization of a minimum amount of circuitry, the following procedure has been found to be useful. First, knowing the carrier frequency and from a knowledge of the upper frequency limit of interest, determine the number of harmonics of interest. For example, for telemeter transmitters operating in the frequency range from 235 to 255 megacycles, and assuming that the upper frequency limit of interest is approximately 1,000 megacycles, the highest harmonic which need be taken account of is the fourth. On a set of attenuation versus frequency axes such as shown in Figure 9 establish the required attenuation levels at the second, third, and fourth harmonic ranges, as for example those levels indicated by the horizontal dashed line 56, 57, and 58. Next, establish the interharmonic plateau attenuation levels, as for example the attenuation levels corresponding to the plateaus 48 and 49. These plateau levels are important not only to provide attenuation to combination frequencies of the carrier, sub-carriers, and harmonics but also because, when properly utilized, they reduce the number of trap circuits required at the higher harmonic frequencies.

Having now established the filter attenuation characteristics, the number of trap circuits required to cover the second harmonic band is established. Since the attenuation slope characteristic between the carrier frequency and the lower edge of the second harmonic band must be rather steep, relatively high Q trap circuits are required for the second harmonic range. Depending upon the attenuation required over this range of frequencies, and the required Q of the circuits the number of traps may be established. In general, two or more trap circuits will be required for the second harmonic frequency range. Assuming for purposes of illustration that three trap circuits are required to cover the second harmonic band, the location of the trap resonant frequencies within that band may be established in the following way. One trap should be resonated at the band center and the other two traps equally spaced about the center frequency and tuned to frequencies in from the band edges by an amount equal to the ratio of the carrier frequency bandwidth to the carrier band central frequency. For example, the 215 to 235 megacycle telemetering band has a carrier frequency bandwidth of 20 megacycles and a central frequency of 225 megacycles so that the ratio 20/225 is approximately equal to 10 percent. Thus, 10 percent of the second harmonic bandwidth, which is 40 megacycles, is equal to 4 megacycles. In practice, the traps of the typical filter previously described were placed 5 megacycles in from the band ends.

Knowing now the location of the trap frequencies for the second harmonic band, the ratio of $L_A/C$ is determined from the known desired trap frequency and the desired Q. Consequently the apparent inductance $L_A$ of the trap coil may be calculated. Next, from the desired plateau level at a frequency $f_r+\Delta f$ which lies between the second and third harmonic frequency bands, a new inductance $L'_A$ may be calculated, where $L'_A$ is the apparent inductance of the trap coil due to the distributed and stray capacitances $C_D$ and $C_S$ at the plateau frequency $f_r+\Delta f$. Since three trap circuits are employed in the second harmonic range and each trap contributes approximately an equal amount to the plateau level, the determination of the new apparent inductance $L'_A$ should be based upon ⅓ of the desired plateau attenuation. The calculated value of $L'_A$ should be checked by the following inequality to insure physical realizability of the true inductance $L_t$.

$$L^1_A > L_A \frac{f_r^2}{(f_r+\Delta f)^2}$$

The true, or low frequency, inductance $L_t$ of the trap circuits is now determined from the equation $$L_t = \frac{L_A L^1_A}{L^1_A + (L^1_A - L_A)\frac{f_r^2}{2f_r\Delta f + (\Delta f)^2}}$$

and the required distributed and stray capacitances are governed by the equation $$C_D + C_S = \frac{1 - \frac{L_t}{L_A}}{(2\pi f_r)^2 L_t}$$

It is generally determinable from the physical properties of the trap circuit components and the case in which it is mounted whether $C_S$ or $C_D$ will be the larger. If $C_S$ is well suppressed, then $C_D$ may be readily designed directly into the inductance. If insufficient $C_D$ is achievable merely by winding the inductance in a particular way, then a small physical capacitance of appropirate magnitude may be shunted across the inductance of the coil to bring the desired shunting capacitance to its design level.

The number of trap circuits for the third harmonic band is determined by the required attenuation and attenuation level provided by the plateau between the second and third harmonic frequency ranges. Assuming, however, that two trap circuits are required, each of the traps is tuned to a frequency equally spaced from the harmonic band center frequency and in from the band edges about the same amount as for the second harmonic end traps. The calculation for the inductance and capacitance required for each of the trap circuits in the third harmonic range is carried out in the same manner as previously described for the second harmonic range. The attenuation level provided by the plateau attenuation between the third and fourth harmonic bands may of itself satisfy the filtering requirement over the fourth harmonic range. Some cases however, may require an additional trap circuit, and this should be tuned to the fourth harmonic center frequency.

An alternative design method which is simpler but which involves the possibility of requiring more trap circuits than a filter designed according to the previous method is as follows. In this method only the average attenuation required over a harmonic frequency range is considered and the plateau attenuation is not designed for, but is accepted at whatever level is established by the naturally occurring values of $C_S$ and $C_D$. The rule is simply this:

Where N circuits are required to cover the second harmonic frequency range, then use (N−1) circuits for the third harmonic range and (N−2) circuits for the fourth harmonic range and so on.

If the rule goes to zero circuits for a particular harmonic then the decision whether to use zero or one circuit at that harmonic depends upon whether or not the plateau attenuation already established is sufficient of itself to meet the attenuation requirements over that harmonic band. Similarly, it may be possible to use less than the rule number of trap circuits at a particular higher order harmonic, again depending upon the plateau attenuation level as correlated with the attenuation requirement.

Although my invention has been described for purposes of clear illustration in connection with a filter for a particular application, my invention is not so limited and the principles of utility and design taught herein are equally applicable to filters for other frequency ranges and application, and such will be readily understood by and useful to those persons normally skilled in the art.

What is claimed as new and useful is:

1. In an electric wave filter having an input circuit and an output circuit including respectively an input terminal and an output terminal connected by a signal line and a signal reference point common to said input and output circuits, a network including a plurality of series circuits each connected between said signal line and said signal reference point, each of said series circuits comprising an inductance and a first capacitance, each of said inductances being shunted by a second capacitance, the inductance and first capacitance of each of said series circuits being series resonant at a different one of a plurality of first frequencies, whereby a peak of attenuation to signals on said signal line is achieved at each of said plurality of first frequencies, said second capacitance of each series circuit being chosen so that the net reactance of the parallel combination of the inductance and shunting capacitance of each of said series circuits renders the circuit admittance characteristic asymmetric above resonance to cause the network admittance at all frequencies between the series resonant frequency and each higher harmonic thereof to remain above a minimum value higher than the network admittance at a frequency equal to one half of the lowest of said plurality of first frequencies, whereby a plateau of minimum attenuation to signals on said signal line is achieved above each of said first frequencies.

2. The filter network according to claim 1 wherein said plurality of first frequencies are harmonic frequencies of one of said frequencies substantially lower than the lowest of said plurality of first frequencies said attenuation plateaus lying between said harmonic frequencies with one plateau occurring between each adjacent pair, the attenuation provided at each plateau including the cumulative attenuation provided by plateaus at lower frequencies.

3. The filter network according to claim 1 wherein said frequencies substantially lower than the lowest of said plurality of first frequencies define a fundamental frequency band, and said plurality of first frequencies all lie within frequency bands harmonically related to said fundamental frequency band, said attenuation plateaus lie between said harmonic frequency bands with one plateau occurring between each adjacent pair of harmonic bands, the attenuation provided at each plateau including the cumulative attenuation provided by plateaus at lower frequencies.

4. The filter network according to claim 3 wherein said harmonic frequency bands include the second and higher harmonic frequencies of said fundamental band, said second harmonic band including a first number of said plurality of series circuits, each successively higher harmonic band including a number of said plurality of series circuits one less than the number of circuits in the adjacent lower harmonic band.

5. The filter network according to claim 4 wherein said second harmonic band includes three series circuits, the third harmonic band includes two series circuits, and the fourth harmonic band includes one series circuit, said fourth harmonic band circuit and one of said second harmonic band circuits being series resonant at the respective harmonic band centers, said third harmonic band circuits, and the remaining second harmonic band circuits being series resonant at frequencies above and below their respective harmonic band center frequency and in from the band ends by a fractional amount of the harmonic band center frequency approximately equal to the ratio of the fundamental frequency range divided by the fundamental frequency range center frequency.

6. The filter network according to claim 1 further including a compartmented case completely enclosing said plurality of series circuits and thereby shielding the latter from external electric and magnetic fields, said case being fitted with signal shielding input and output means coupled to said input and output terminals said signal line passing through each compartment, each compartment containing a fractional number of said plurality of series circuits whereby the circuits in each compartment are shielded from the circuits in all other compartments and the tendency toward frequency pulling is thereby minimized.

7. The cased filter network according to claim 6 wherein said case serves as said signal reference point common to said input and output circuits, one terminal of each of said plurality of series circuits being connected to said case, said shielding input and output means being also connected to said case.

8. The cased filter network according to claim 6 further including an auxiliary inductance within said case in series with said signal line and between certain ones of said plurality of series circuits and others of said plurality of series circuits.

9. The cased filter network according to claim 8 wherein said frequencies substantially lower than the lowest of said plurality of first frequencies define a fundamental frequency band, said plurality of first frequencies all lying within frequency bands harmonically related to said fundamental frequency band, and series circuits tuned to frequencies in the same harmonic band are located in separate compartments of said compartmented case.

10. The cased filter according to claim 9 wherein at least a portion of said auxiliary inductance interposes series circuits tuned to frequencies in the same harmonic band.

11. The cased filter according to claim 8 further including at least a second auxiliary inductance within said case in series with said signal line and effective to alter the network admittance relative to the driving point admittance of a signal source selected for driving said filter so that spurious frequencies are not generated by said signal source and signal power transfer between said input and output terminals is improved.

References Cited in the file of this patent

UNITED STATES PATENTS

| | | |
|---|---|---|
| 1,749,841 | Nyquist | Mar. 11, 1930 |
| 1,836,575 | Cannon | Dec. 15, 1931 |
| 1,962,910 | Rives | June 12, 1934 |
| 2,252,609 | Beck | Aug. 12, 1941 |
| 2,313,440 | Huge | Mar. 9, 1943 |
| 2,355,516 | Devot | Aug. 8, 1944 |
| 2,682,037 | Bobis et al. | June 22, 1954 |
| 2,738,466 | Niederman | Mar. 13, 1956 |
| 2,844,801 | Sabaroff | July 22, 1958 |

FOREIGN PATENTS

| | | |
|---|---|---|
| 740,465 | Great Britain | Nov. 16, 1955 |
| 952,403 | France | May 2, 1949 |

OTHER REFERENCES

Schmidt: abstract of application #132,876. Published March 6, 1951. O. G. vol. 644, page 305.